(12) United States Patent
Walenty et al.

(10) Patent No.: US 6,748,311 B1
(45) Date of Patent: Jun. 8, 2004

(54) METHODS AND APPARATUS FOR INHIBITING MOVEMENT OF AN AUTOMOBILE IN A PITCHED POSITION

(75) Inventors: Allen J. Walenty, Macomb, MI (US); Kevin G. Leppek, Rochester Hills, MI (US); Calvin E. Wolf, Mt. Clemens, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/431,743

(22) Filed: May 8, 2003

(65) Prior Publication Data

(65)

(51) Int. Cl.[7] .................................................. G06G 7/76
(52) U.S. Cl. .............................. 701/70; 701/78; 701/79
(58) Field of Search ............................ 701/70, 78, 79, 701/83, 96, 110; 303/125, 132

(56) References Cited

U.S. PATENT DOCUMENTS

| 3,918,058 A | * 11/1975 | Noyori et al. ................. 342/71 |
| 5,024,299 A | 6/1991 | Shaw et al. ................... 188/156 |
| 5,058,017 A | * 10/1991 | Adachi et al. ................. 701/38 |
| 5,139,315 A | 8/1992 | Walenty et al. ............... 303/95 |

* cited by examiner

*Primary Examiner*—Gertrude A. Jeanglaude
(74) *Attorney, Agent, or Firm*—Christopher DeVries (57) ABSTRACT

Apparatus and methods are provided for controlling movement of an automobile in a pitched position. The apparatus has an attitude sensor that is configured to determine a pitch of the automobile and a speed sensor that is configured to determine a speed of the automobile. In addition, the apparatus has a braking mechanism that is configured to inhibit movement of the automobile and a controller that is configured to control the braking mechanism. The controller is configured to receive the pitch and the speed determined by the attitude sensor and the speed sensor, respectively, and control the braking mechanism based at least in part upon an evaluation of the pitch and the speed in order to inhibit movement of the automobile in the pitched position.

31 Claims, 5 Drawing Sheets

METHODS AND APPARATUS FOR INHIBITING MOVEMENT OF AN AUTOMOBILE IN A PITCHED POSITION

TECHNICAL FIELD

The present invention generally relates to control of automobile movement and, more particularly, to methods and apparatus for inhibiting movement of an automobile in a pitched position.

BACKGROUND OF THE INVENTION

Methods and apparatus are continually sought to assist operator control of automobile movement. Furthermore, methods and apparatus are especially desirable that assist operator control of automobile movement when the automobile is located on an inclining or declining surface (i.e., methods and apparatus are especially desirable that assist operator control of an automobile in a pitched position). This assistance is particularly desirable for an automobile equipped with a manual transmission.

Generally, an automobile operator manipulates multiple controls of a manual transmission in a relatively short succession to resume motion after the automobile has significantly slowed or ceased to move. For example, an operator manipulates a clutch pedal, a brake pedal, and an accelerator pedal of the automobile in order to resume motion after the automobile has slowed or discontinued to move. More specifically, the operator will typically release the clutch pedal while releasing the brake pedal and pressing on the accelerator pedal.

When the automobile is located on an inclining or declining surface, the manipulation of the multiple controls of the manual transmission generally involves balancing the manipulation of the accelerator pedal and the clutch pedal in order to offset the tendency of the automobile to move because of the pitched position of the automobile. While automobile operators have become quite adept at the machinations for successfully slowing movement or discontinuing movement of the automobile that is at least partially due to the pitched position of the automobile, it remains desirable to continually seek automobile control strategies that ease the activities of the operators and assist with the control of an automobile that is located on an inclining or a declining surface (i.e., in a pitched position).

In view of the foregoing, it should be appreciated that it would be desirable to provide methods and apparatus for controlling movement of an automobile, and particularly to methods and apparatus for inhibiting movement of an automobile in a pitched position. In addition, it should be appreciated that it would be desirable to provide methods and apparatus for inhibiting movement of an automobile in a pitched position that has a manual transmission. Furthermore, additional desirable features will become apparent to one skilled in the art from the foregoing background of the invention, and the summary of the invention, detailed description of the invention, the corresponding drawings, appended claims, and the abstract of the invention.

SUMMARY OF THE INVENTION

An apparatus is configured to control movement of an automobile in a pitched position. The apparatus comprises an attitude that is configured to determine a pitch of the automobile and a speed sensor that is configured to determine a speed of the automobile. In addition, the apparatus comprises a braking mechanism that is configured to inhibit movement of the automobile and a controller that is configured to control the braking mechanism. The controller is configured to receive the pitch and the speed determined by the attitude and the speed sensor, respectively, and control the braking mechanism based at least in part upon an evaluation of the pitch and the speed in order to inhibit movement of the automobile in the pitched position.

In addition to the apparatus, a method is provided to control movement of an automobile in a pitched position. The method comprises the steps of determining a pitch of the automobile and determining a speed of the automobile. In addition, the method comprises the steps of evaluating the pitch and the speed of the automobile and controlling a braking mechanism based at least in part upon the evaluation of the pitch and the speed in order to inhibit movement of the automobile in the pitched position.

BRIEF DESCRIPTION OF THE DRAWINGS

The preferred exemplary embodiments of the present invention will hereinafter be described in conjunction with the appended drawings, where like designations denote like elements, and.

DESCRIPTION OF THE PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
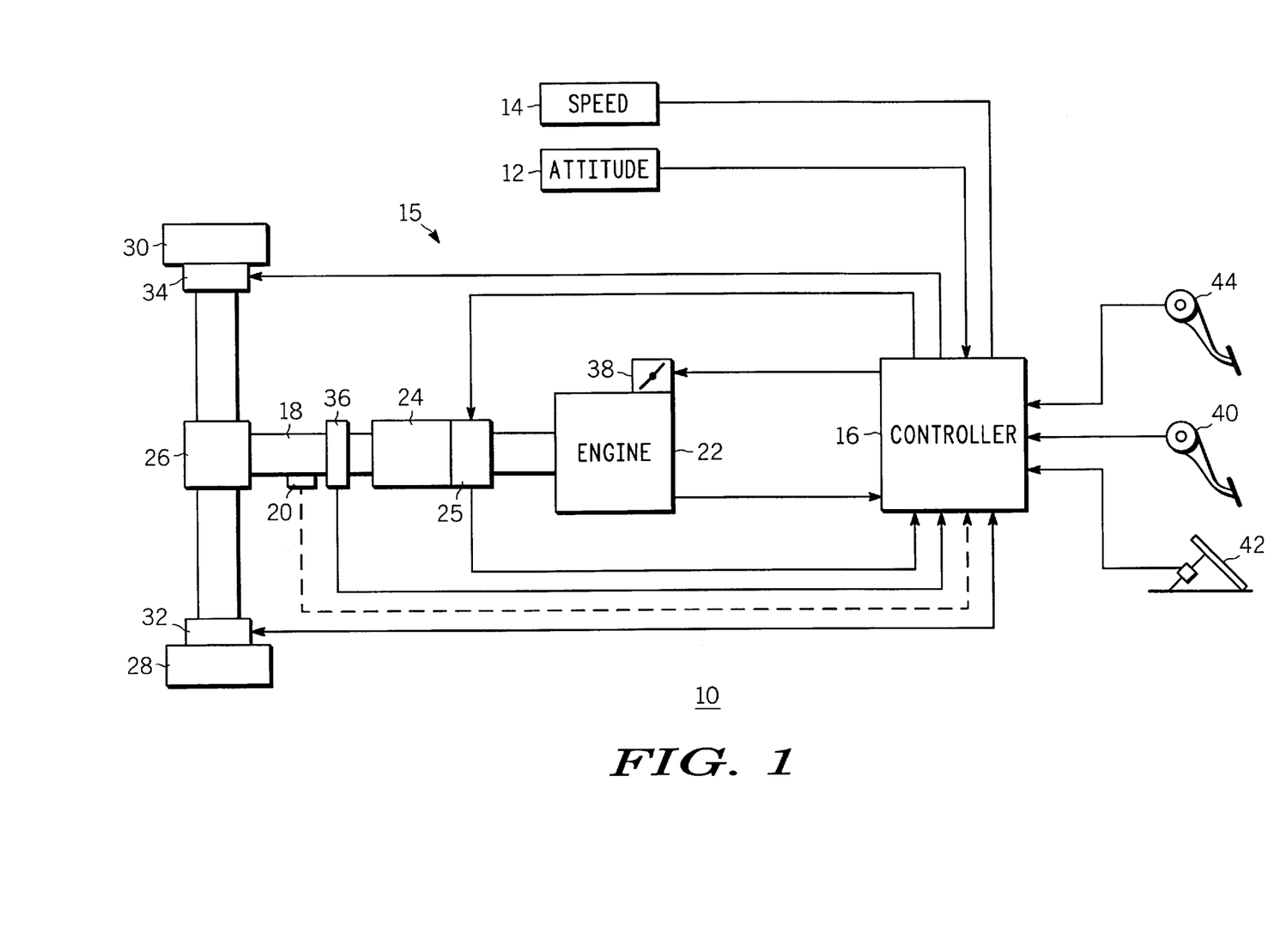
FIG. 1 is a simplified illustration of an apparatus for inhibiting movement of an automobile in a pitched position according to an exemplary embodiment of the present invention.

Referring to FIG. 1, a simplified schematic is illustrated of an apparatus 10 for inhibiting movement of an automobile (not shown) in a pitched position in accordance with an exemplary embodiment of the present invention. Generally, the apparatus 10 includes an attitude sensor 12 that is configured to determine the relationship between one or more axes of the automobile and a reference datum, which shall be generally referred to herein as the pitch of the automobile. In addition, the apparatus 10 includes a speed sensor 14 that is configured to determine a speed of the automobile. Furthermore, the apparatus 10 includes at least one braking mechanism that is configured to inhibit movement of the automobile as subsequently described in this detailed description of the invention. The apparatus 10 also includes a controller 16 that is configured to receive the pitch determined by the attitude sensor 12 and the speed determined by the speed sensor 14. The controller 16 is also configured to control the braking mechanism based at least in part upon an evaluation of pitch and the speed of the automobile in order to inhibit movement of the automobile generally resulting from the pitched position of the automobile. Preferably, the apparatus 10 is utilized in an automobile having a manual transmission. However, the apparatus 10 can be utilized in an automatic transmission or other transmission configurations.

The attitude sensor 12 can have any number of configurations and utilize any number of techniques to determine the pitch of the automobile. For example, the pitch can be determined with a wheel speed sensor, gyroscope, accelerometer, fluid level sensor in a fluid reservoir, and the like, or various combinations of these sensors or other sensors. The pitch of the automobile can be specified with respect to any number of reference datums and defined by one or more angles. For example, the pitch of the automobile can be specified with respect to a fixed inertial reference frame of one or more axes and defined by one or more Euler angles as known to those of ordinary skill in the art. The attitude sensor 12 preferably provides a pitch of the automobile in degrees and provides an indication of the positive or negative nature of the pitch. More specifically, and for illustrative purposes only, the pitch shall have a positive value if the front of the automobile is above the rear of the automobile (e.g., the front of the automobile is facing up an inclined surface). In addition, the pitch shall have a negative value if the rear of the automobile is above the front of the automobile (e.g., the rear of the automobile is facing up an inclined surface).

The speed sensor 14 can also have any number of configurations and utilize any number of techniques to determine the speed of the automobile. For example, the speed of the automobile can be determined with an accelerometer, speedometer or the like. In addition, the speed can be calculated from an operating parameter of the automobile measured by the speed sensor 14, or calculated from multiple operating parameters of the automobile as measured by the speed sensor 14 or one or more sensors other than the speed sensor 14. For example, the automobile speed can be calculated from the rotational speed of a drive shaft 18 as measured by a drive shaft sensor 20 according to techniques known to those of ordinary skill in the art.

The speed and the pitch of the automobile are provided to the controller 16 for evaluation. The controller 16 can be a single processing unit or multiple processing units having one or more memories. The one or more memories of the controller 16 can be configured to store data and executable instructions for controlling the braking mechanism based at least in part upon an evaluation of the speed and the pitch of the automobile.

Any number of braking mechanisms can be controlled by the controller 16 to individually slow down or stop movement (i.e., inhibit movement) of the automobile due to automobile pitch, or multiple braking mechanisms can be collectively controlled and/or adaptively selected by the controller 16 to inhibit movement. In this detailed description of the invention, one example of a braking mechanism is an automobile drive train 15, i.e., engine 22 coupled to a transmission 24, which is in turn coupled by draft shaft 18 and differential 26 to at least one of two wheels (28,30). In this detailed description of the invention, another example of a braking mechanism is a wheel braking system including at least one of the two wheel brakes (32,34) and an electromechanical brake (EMB) 36. However, other braking mechanisms can be used in accordance with present invention. Each of these braking mechanisms (16,32,34,36) can be used individually, or any combination of these braking mechanisms (16,32,34,36) or other braking mechanisms can be used in accordance with the present invention.

Figure 2:
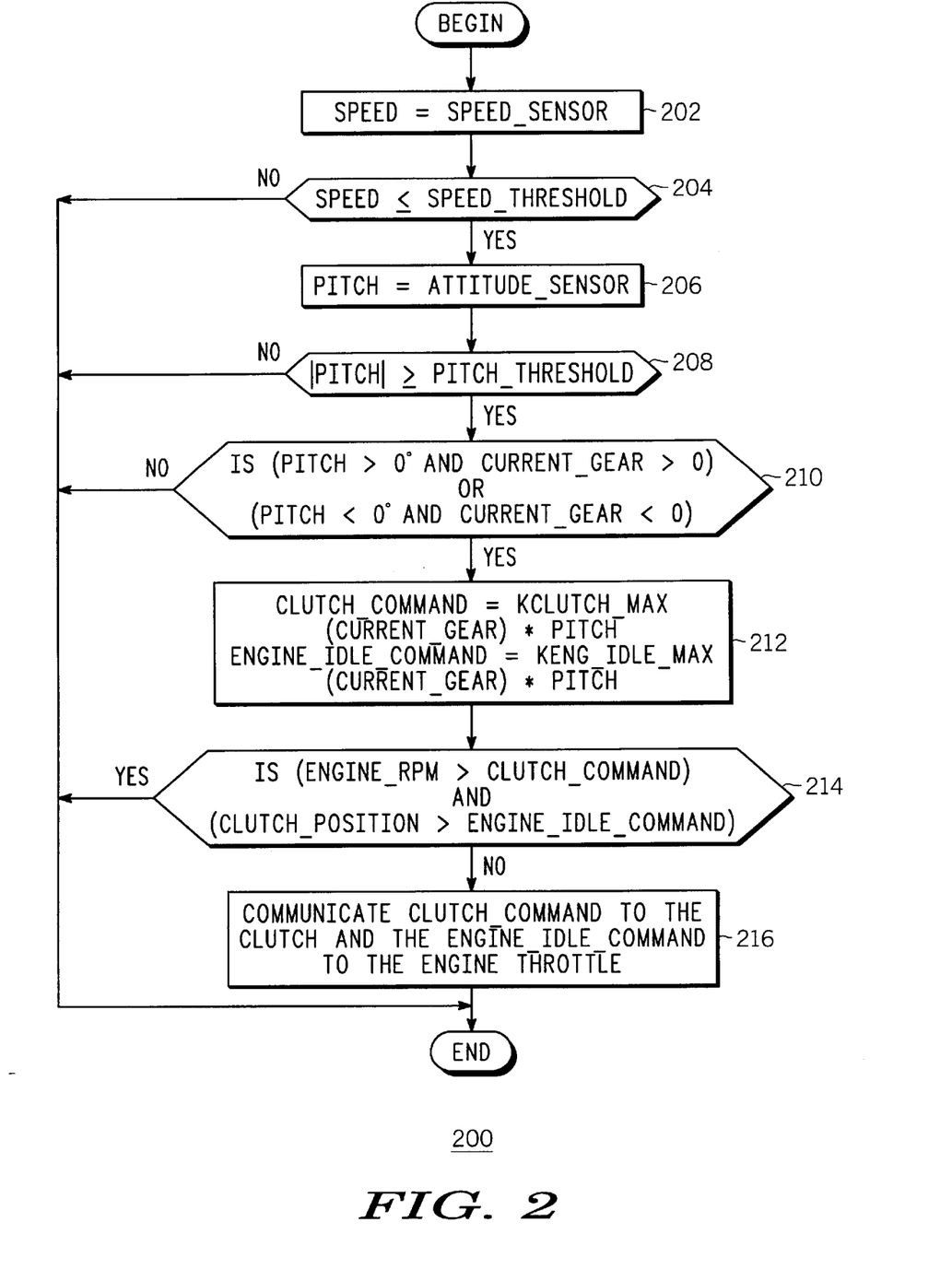
FIG. 2 is a flow chart illustrating a first method for inhibiting movement of an automobile in a pitched position according to an exemplary embodiment of the present invention.

Continuing to refer to FIG. 1 and with additional reference to FIG. 2, a method 200 is illustrated in accordance with a first exemplary embodiment of the present invention. The method 200 can be executed by the controller 16 to inhibit movement of an automobile with the automobile drive train 15 that is configured as the braking mechanism. The method 200 begins by receiving the speed of the automobile (e.g., Speed=Speed_Sensor) 202 and continues with a comparison between the speed and a speed threshold (Speed_Threshold) (i.e., Speed≦≈Speed_Threshold) 204. The speed threshold can have any number of values. For example, the speed threshold can have a relatively small value, such as zero or approximately zero. However, the speed threshold can have a value greater than zero, and this value is selected to define the speed of the automobile at which the automobile drive train 15 is enabled to inhibit movement of the automobile. If the automobile speed is not equal to the speed threshold or less than the speed threshold, the method 200 discontinues. Otherwise, the method 200 continues by receiving the pitch of the automobile (Pitch=Attitude_Sensor) 206.

Once the pitch has been received by the controller 16, a comparison is conducted between the absolute value of the pitch and a pitch threshold (Pitch_Threshold) (i.e., |Pitch|≧≈Pitch_Threshold) 208. The pitch threshold can have any number of values. For example, the pitch threshold can have a relatively small value, such as a value of about one degree (1°). However, the pitch threshold can have a value greater than about one degree or less than the value of about one degree (1°), and this value is selected to define the pitch of the automobile at which the automobile drive train 15 is enabled to inhibit movement of the automobile. If the absolute value of the automobile pitch is equal to the pitch threshold or greater than the pitch threshold, the method 200 preferably continues to evaluate additional conditions that are preferably met before the automobile drive train 15 is enabled for inhibiting movement of the automobile. If this condition is not met, the method 200 discontinues.

In addition to an evaluation of the automobile speed and the automobile pitch, the method 200 preferably evaluates the pitch with respect to the direction that the automobile is configured to move 210. If the pitch is positive (i.e., Pitch>0°) and the automobile is configured for forward motion (i.e., Current_Gear>0), or the pitch is negative (i.e., Pitch<0°) and the automobile is configured for reverse motion (i.e., Current_Gear<0), the automobile drive train 15 is enabled to inhibit movement of the automobile.

The determination of whether the automobile is configured for forward or reverse motion can be conducted using any number of techniques. For example, the selected gear of the automobile transmission 24 can be provided to the controller 16. If one of the forward gears is selected, the automobile is configured for forward motion, and if the reverse gear or one of multiple reverse gears is selected, the automobile is configured to reverse motion.

Once the determination has been made that the automobile drive train 15 is enabled to inhibit movement of the automobile, the controller 16 determines a clutch command (Clutch_Command) and an engine idle command (Engine_Idle_Command) 212. The clutch command and the engine idle command are determined such that the clutch 26 of the transmission 24 and the engine throttle 38 are configured for application of an output torque at one or more of the wheels (28,30). The output torque applied to one of the wheels (28,30) or both of the wheels (28,30) counterbalances the force on the wheels (28,30) due to the pitch of the automobile. The counterbalancing force of the output torque substantially negates the force on the wheels due to the pitch of the automobile, and substantially inhibits motion of the automobile that would exist without application of the output torque. For example, the tendency of an automobile to roll backward or forward on an inclining or declining surface would be counterbalanced by a corresponding application of the output torque to one or more of the wheels (28,30).

The clutch command (Clutch_Command) and the engine idle command (Engine_Idle_Command) are calculated based at least in part upon the currently selected transmission gear (Current_Gear) and the automobile pitch (Pitch) as follows:

$$\text{Clutch\_Command} = \text{Kclutch\_Max}(\text{Current\_Gear}) * \text{Pitch} \quad (1)$$

$$\text{Engine\_Idle\_Command} = \text{Keng\_Idle\_Max}(\text{Current\_Gear}) * \text{Pitch} \quad (2)$$

where Kclutch_Max is the maximum clutch command for each gear with one hundred percent (100%) generally corresponding to a full clutch release and Keng_idle_Max is the maximum engine idle speed command for each gear, both of which can be determined according to techniques known to those of ordinary skill in the art. In this way, the clutch engages the currently selected gear to the extent designated by the clutch command and adjusts the throttle of the engine according to the engine idle command such that output torque is provided to inhibit movement of the automobile due to the pitched position.

The controller 16 preferably does not adjust the engine throttle 38 and the clutch 36 according to the clutch command and/or engine idle command calculated with equation (1) and equation (2), respectively, to inhibit movement with the automobile drive train 15 if the automobile operator is requesting a clutch position and the engine 22 is generating sufficient rotations-per-minute (rpm) to compensate for the movement due to the pitched position of the automobile. Therefore, the method 200 compares the position of the clutch 40 (Clutch_Position) to the clutch command (Clutch_Command) calculated with equation (1) and the current engine rpm generated by the engine 22 (Engine_RPM) to the engine idle command (Engine_Idle_Command) 214 calculated with equation (2). If the clutch position is greater than the calculated clutch command (i.e., Clutch_Position>Clutch_Command) and the current engine rpm generated by the engine 22 is greater than the calculated engine idle command (i.e., Engine_RPM>Engine_Idle_Command), the operator is requesting a clutch position and engine throttle position that compensates for movement due to the automobile pitch. Therefore, if these conditions are met, the clutch command and engine idle command are not provided to the clutch 36 and the engine throttle 38. Otherwise, the clutch command and the engine idle command are communicated to the clutch 36 and the engine throttle 38 to inhibit movement of the automobile due to automobile pitch 216.

The method 200 as previously described in this detailed description of the invention can be used individually or in combination with other methods and braking mechanism. For example, a method can be performed by the controller 16 to inhibit movement of an automobile in a pitched position with a wheel braking system. For illustrative purposes only, the wheel braking system in this detailed description of the invention is a conventional hydraulic braking system that includes a master cylinder (not shown) actuated by a brake pedal 42 with operator application of a force to request application of pressure to one or more of the wheel brakes (32,34). Preferably, the wheel brakes (32,34) are electrically operated brakes that take the form of an electrically operated drum brake in which braking torque is established by operation of a DC torque motor (not shown) at a value proportional to the torque output of the DC torque motor that is controlled by the controller 16. An example of such electrically-operated brakes is described in U.S. Pat. No. 5,139,315 entitled "Vehicle Parking Brake System and Method," issued to Walenty et al on Aug. 18, 1992, and U.S. Pat. No. 5,024,299 entitled "Electric Drum Brake," issued to Shaw et al on Jun. 18, 1991, which are both incorporated in their entirety by reference. In addition to the wheel brakes (32,34), the wheel braking system preferably includes the EMB 36.

Figure 3:
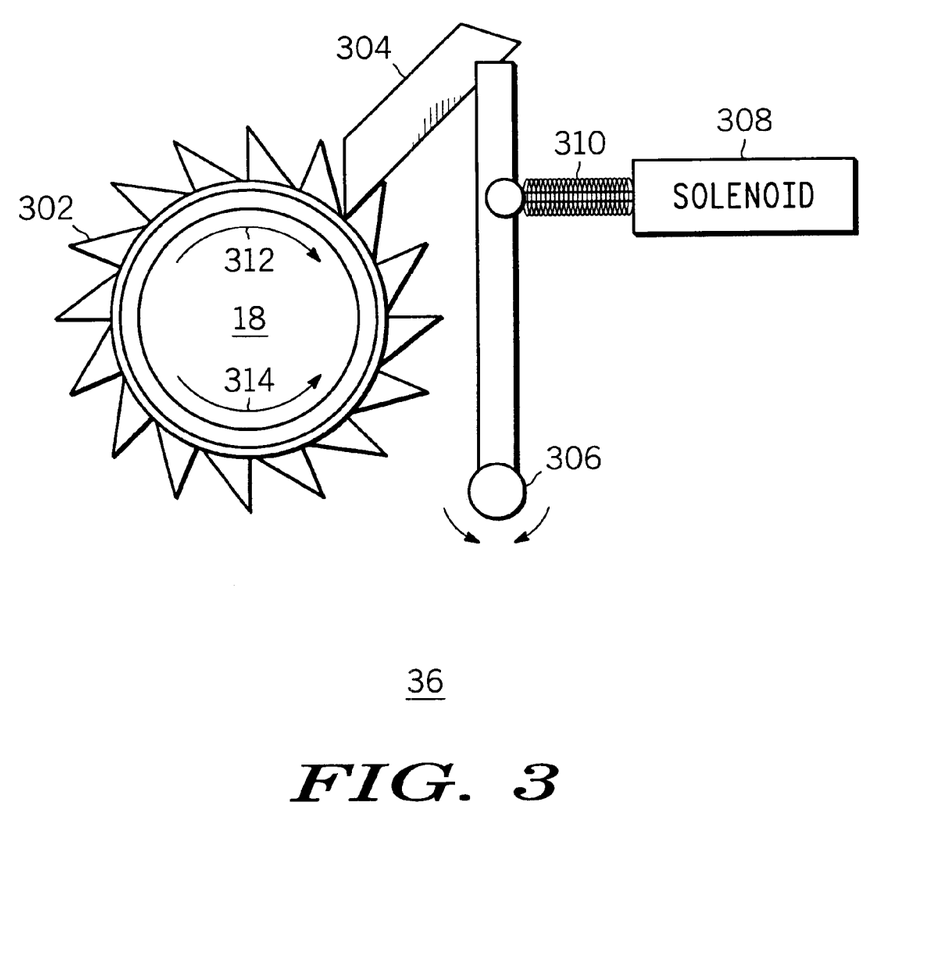
FIG. 3 is an electro-mechanical brake (EMB) according to an exemplary embodiment of the present invention.

Referring to FIG. 3, the EMB 36 is illustrated in accordance with an exemplary embodiment of the present invention. The EMB 36 includes an axle-mounted gear set 302, a latch mechanism 304, a pivotable connection 306, a solenoid 308, and a spring-loaded connecting arm 310. The latch mechanism 304 is coupled to the pivotable connection 306 and the movement of the latch mechanism 304 is selectively controlled by the solenoid 308 and spring-loaded connecting arm 310. The spring-loaded connecting arm 310 couples the latch mechanism 304 to solenoid 308, and the axle-mounted gear set 302 is selectively engaged by latch mechanism 304. In operation, activation of the solenoid 308 engages the latch mechanism 304 and the axle-mounted gear set 302. This activation of the solenoid 308 also creates tension in the spring-loaded connecting arm 310 such that the drive shaft 18 is inhibited from rotation in a first direction 312. However, the EMB 36 can be configured to inhibit movement in a second direction 314, or inhibit movement in the first direction 312 and the second direction 314. Conversely, deactivation of the solenoid 308 disengages the latch mechanism 304 from the axle-mounted gear set 302 as the latch mechanism 304 is decoupled from axle-mounted gear set 302 such that the drive shaft 18 is not inhibited from rotation in the first direction 312 and/or the second direction 314. This activation and deactivation of the EMB 36 can be utilized in conjunction with the wheel brakes (32,34) or utilized in conjunction with other braking mechanisms.

Figure 4:
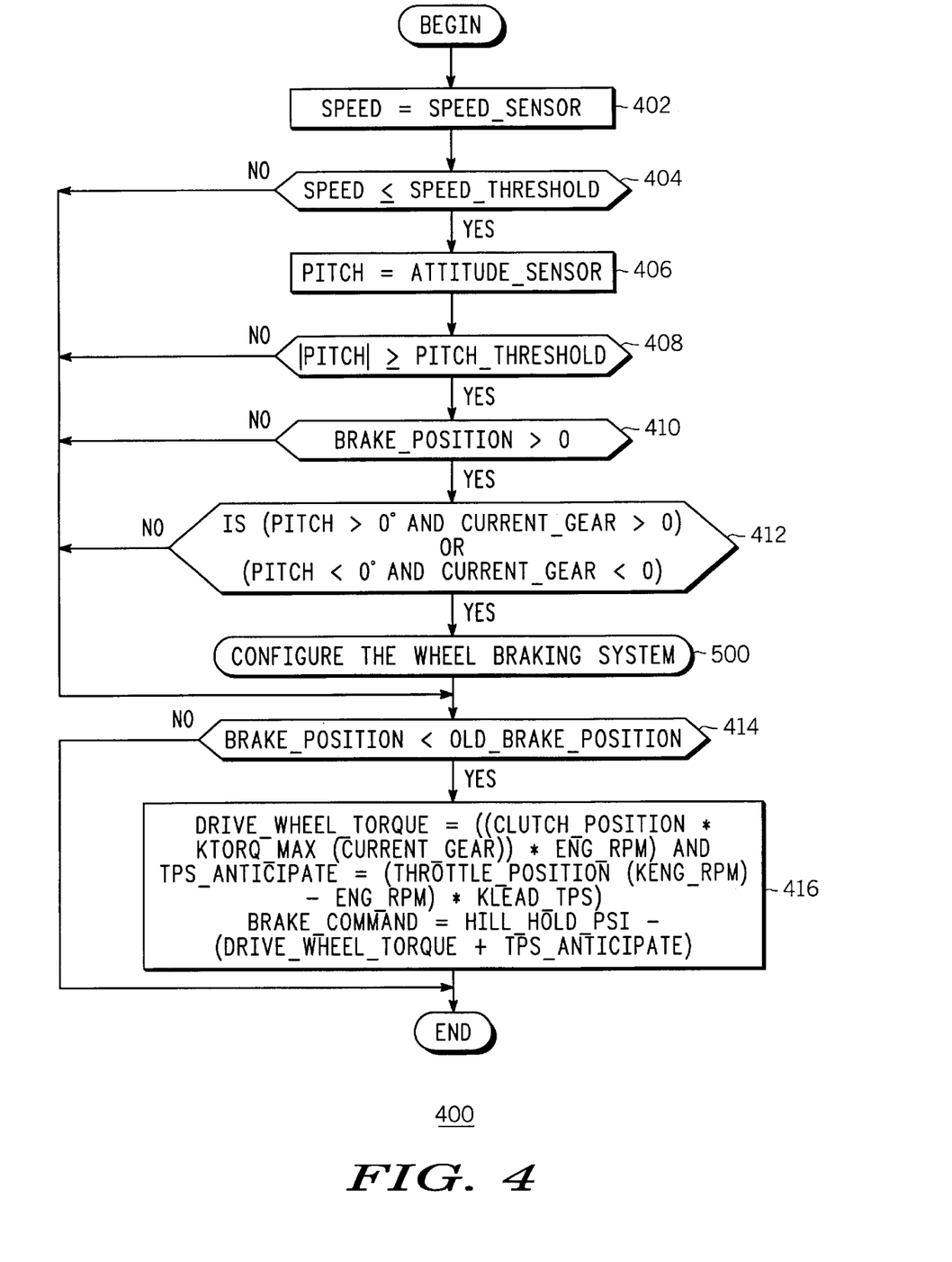
FIG. 4 is a flow chart illustrating a second method for inhibiting movement of an automobile in a pitched position according to an exemplary embodiment of the present invention.

Referring to FIG. 1 and with additional reference to FIG. 4, a method 400 is illustrated in accordance with a second exemplary embodiment of the present invention, which utilizes the EMB 36 in conjunction with the wheel brakes (32,34) to inhibit movement of the automobile in a pitched position. The method 400 begins by receiving the speed of the automobile (e.g., Speed=Speed_Sensor) 402 and continues with a comparison between the speed and a speed threshold (Speed_Threshold) 404 (e.g., Speed≦Speed_Threshold) as discussed with reference to FIG. 2. In addition, the method 400 receives the pitch of the automobile (e.g., Pitch=Attitude_Sensor) 406 and conducts a comparison between the absolute value of the pitch and a pitch threshold (Pitch_Threshold) 408 as discussed with reference to FIG. 2. If the automobile speed is equal to or less than the speed threshold or the absolute value of the automobile pitch is equal to or greater than the pitch threshold, the method 400 preferably continues to evaluate additional conditions that are preferably considered in operating the wheel braking system. If the speed condition or the attitude condition is not met, the method 400 discontinues.

In addition to an evaluation of the automobile speed and the automobile pitch, the method 400 preferably determines whether the automobile operator is presenting a force to the conventional brake pedal 44 as a request to apply hydraulic pressure to one or more of the wheel brakes (32,34) 410 (e.g., Brake_Position>0). If the automobile operator is not requesting application of the hydraulic pressure to one or more of the wheel brakes, the method 400 discontinues. If the automobile operator is requesting activation of one or more of the wheel brakes (32,34), the method 400 evaluates the pitch with respect to the direction that the automobile is configured to move 412 as described with reference to FIG. 2. As discussed with reference to FIG. 2, if the pitch is positive and the automobile is configured for forward motion (e.g., Pitch>0° and Current_Gear>0), or the attitude is negative and the automobile is configured for reverse motion (e.g., Pitch<0° and Current_Gear<0), the wheel braking system is enabled to inhibit movement of the automobile due to the pitched position of the automobile. Once the determination has been made that the wheel braking system is enabled to inhibit movement of the automobile, the method 400 configures the wheel braking system 500.

Figure 5:
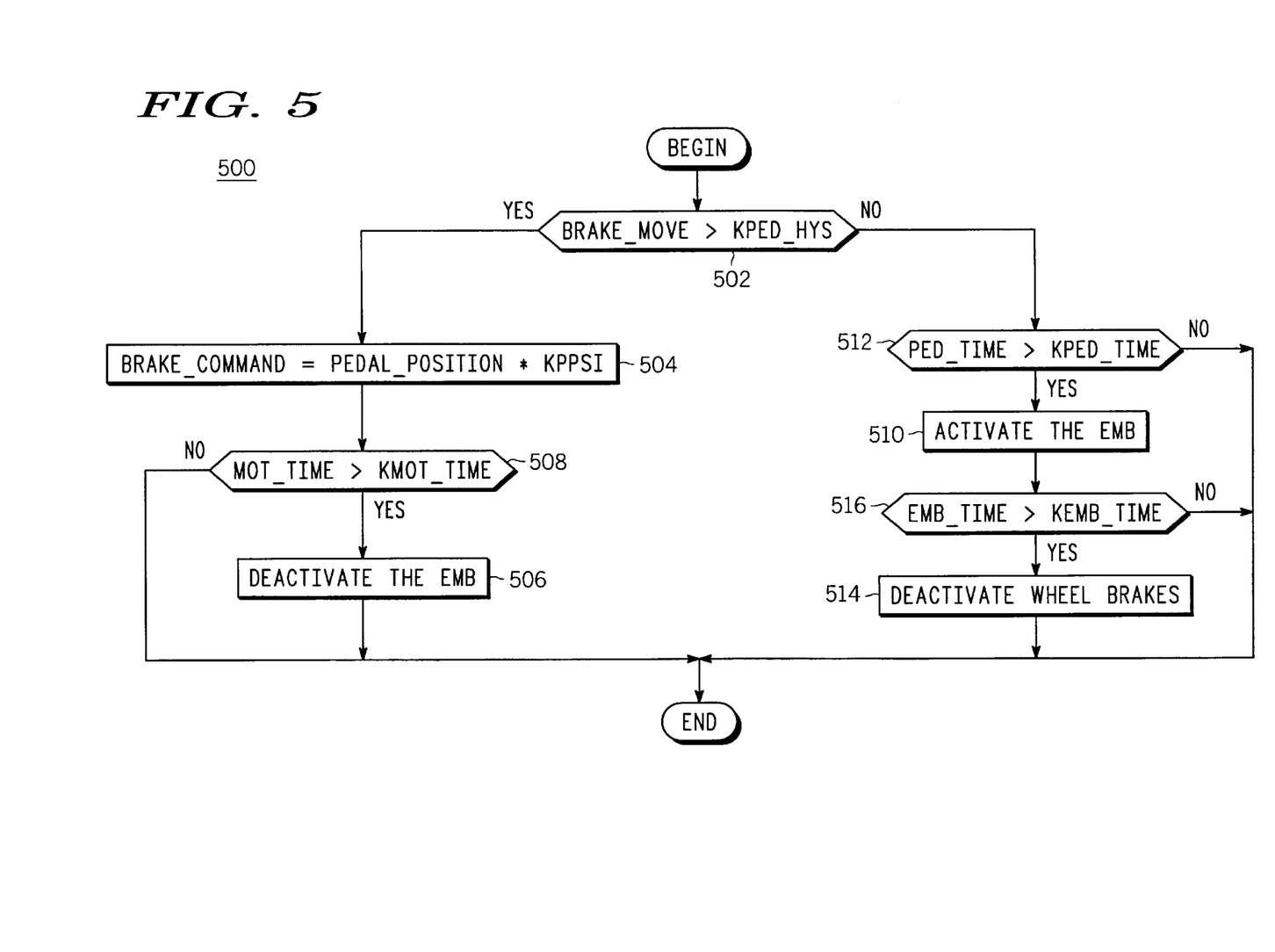
FIG. 5 is a flow chart illustrating the configuring of the wheel braking system of FIG. 4 according to an exemplary embodiment of the present invention.

Referring to FIG. 5 in addition to FIG. 1, configuring the wheel braking system 500 initially determines if the operator is changing the position of the brake pedal to request a new braking torque from the wheel brakes 502. This determination can be accomplished using any number of techniques. For example, the previous position of the brake pedal 44 (i.e., Old_Brake_Position) can be subtracted from the current position of the brake pedal 44 (i.e., Brake_Position). The magnitude of this difference (Brake_Move=Brake_Position−Old_Brake_Position) can be compared to a hysterisis calibration threshold (Kped_Hys), which is determined in accordance with techniques known to those of ordinary skill in the art. If the magnitude of the difference between the previous position of the brake pedal 44 and the current position of the brake pedal 44 exceeds the hystereris calibration threshold (i.e., Brake_Move>Kped_Hys), the automobile operator has altered the position of the brake pedal 44 and is requesting a new braking torque from the wheel brakes (32,34). Otherwise, the automobile operator has not altered the position of the brake pedal 44 and is not requesting a new braking torque from the wheel brakes (32,34). As can be appreciated by those of ordinary skill in the art, other techniques can be used to determine if the operator is changing the position of the brake pedal 44 to request a new braking torque from the wheel brakes (32,34) 502.

In the event that the operator is changing the position of the brake pedal 44 to request a new braking torque from the wheel brakes (32,34), a brake command (Brake_Command) is calculated to provide the new braking torque 504. The calculation of the brake command 504 can be accomplished using any number of techniques. For example, and in accordance with an exemplary embodiment of the present invention, the brake command is calculated as follows:

$$\text{Brake\_Command} = \text{Pedal\_position} * KPPSI \quad (3)$$

where Pedal_position is the position of the brake pedal 44 and KPPSI is a calibration value that converts the pedal position to a braking torque, which can be determined according to techniques known to those of ordinary skill in the art.

After the calculation of the brake command 504, the EMB 36 is deactivated 506 if a determination is made that the period since the change in the brake request (Mot_Time) exceeds a mechanical delay (Kmot_Time) 508 (i.e., Mot_Time>Kmot_Time). The mechanical delay is preferably associated with the period it takes for the wheel brakes (32,34) to establish a braking torque, and this delay can be determined using any number of techniques known to those of ordinary skill in the art. In this way, braking torque is generally established with the wheel brakes (32,34) before releasing the EMB 36, which is inhibiting movement of the automobile.

In the event that the operator is not changing the position of the brake pedal 44, the EMB 36 is activated 510 if it is determined that the period since the last change in brake pedal position (Ped_time) exceeds a predetermined period (Kped_time) (i.e., Ped_Time>Kped_Time) 512. In this way, the determination is made that the operator is requesting a relatively steady brake pressure, and the EMB 36 can be activated to provide a relatively stable braking action, while disengaging the wheel brakes (32,34) to conserve energy. Preferably, the wheel brakes (32,34) are deactivated 514 if the period since activation of the EMB (EMB_Time) exceeds the predetermined EMB deployment time (KEMB_Time) 516. In this way, braking torque is generally established with the EMB 36 before disengaging the wheel brakes (32,34) to converse energy.

Referring to FIG. 4 and with continuing reference to FIG. 1, the method 400 is configured to determine if the operator is requesting a reduction in braking torque 414. Furthermore, if the operator is requesting a reduction in braking torque and the EMB 36 and/or wheel brakes are configured to inhibit movement of the automobile, the brake command is recalculated such that the release of the brake torque is conducted in a manner that provides an appropriate transition as the operator releases the brake pedal 44.

The release of brake pressure in an automobile having a manual transmission generally follows the release movement of the clutch versus engine RPM. A rapid release of brake pressure can be necessary if the operator requests a throttle position at a rate that is faster than the engine components can respond. As the operator increases the throttle position and releases the clutch, it is preferable that the braking system does not inhibit the acceleration of the drive wheels (32,34).

Therefore, in accordance with an exemplary embodiment of the present invention, the recalculation of the braking command includes the calculation of an anticipatory brake pressure, which is related to the position of the throttle. The anticipatory brake pressure is generally limited to an amount that is slightly greater that the maximum rate for positioning of the throttle. Therefore, recalculation of the brake command (Brake_Command) will be generally inversely proportional to the engine output torque at the drive wheels as follows:

$$\text{Drive\_Wheel\_Torque} = ((\text{Clutch\_Position} * \text{Ktorq\_Max}(\text{Current\_Gear})) * \text{Eng\_RPM} \quad (4)$$

$$TPS\_\text{Anticipate} = (\text{Throttle\_Position}(\text{Keng\_RPM}) - \text{Engine\_RPM}) * \text{Klead}\_TPS \quad (5)$$

$$\textit{Brake}\_\text{Command} = \text{Hill\_Hold\_PSI} - (\text{Drive\_Wheel\_Torque} + \text{TPS\_Anticipate}) \quad (6)$$

where Drive_Wheel_Torque is the calculated, estimated or measured torque applied to the drive wheels (32,34), Clutch_Position is the current position of the clutch that can be calculated, estimated or measured according to techniques known to those of ordinary skill in the art, Ktorq_Max is the maximum torque that can be applied to the drive wheels (32,34), Current_Gear is the current gear engaged by the transmission 24, Eng_RPM is the current operating rpm of the engine 22, Throttle_Position is the current position of the engine throttle 38, Keng_RPM is the maximum rpm of the engine 22, Klead_TPS is a lead time calibration value, and Hill_Hold_PSI is the calculated amount of brake pressure for inhibiting movement of the vehicle. This provides a desirable transition with the release of the brake torque and application of the drive wheel torque, which minimizes undesirable movement during such a transition and provides the appropriate transition as the operator releases the brake pedal 44.

While certain elements have been presented in the foregoing detailed description of the preferred exemplary embodiments, it should be appreciated that a vast number of variations in the embodiments exist. It should also be appreciated that the preferred exemplary embodiments are only examples, and are not intended to limit the scope, applicability, or configuration of the invention in any way. Rather, the foregoing detailed descriptions provide those skilled in the art with a convenient road map for implementing the preferred exemplary embodiments of the invention. It should also be understood that various changes may be made in the function and arrangement of elements described in the exemplary preferred embodiments without departing from the spirit and scope of the invention as set forth in the appended claims.

What is claimed is:

1. An apparatus for inhibiting movement of an automobile in a pitched position, comprising:
    an attitude sensor that is configured to determine a pitch of the automobile;
    a pitch sensor that is configured to determine a speed of the automobile;
    a braking mechanism that is configured to inhibit movement of the automobile; and
    a controller that is configured to:
        receive said pitch determined by said attitude sensor;
        receive said speed determined by said speed sensor; and
        control said braking mechanism based at least in part upon an evaluation of said pitch and said speed in order to inhibit movement of the automobile in the pitched position.

2. The apparatus for inhibiting movement of the automobile in the pitched position of claim 1, wherein said braking mechanism is an automobile drive train.

3. The apparatus for inhibiting movement of the automobile in the pitched position of claim 2, wherein said automobile drive train comprises:
    an engine of the automobile;
    a transmission coupled to said engine;
    a drive shaft coupled to said transmission;
    a differential coupled to said drive shaft; and
    a wheel coupled to said differential.

4. The apparatus for inhibiting movement of the automobile in the pitched position of claim 1, wherein said braking mechanism is a wheel braking system.

5. The apparatus for inhibiting movement of the automobile in the pitched position of claim 1, wherein said braking mechanism is an electro-mechanical brake (EMB).

6. The apparatus for inhibiting movement of the automobile in the pitched position of claim 1, wherein said wheel braking system comprises a wheel brake and an electro-mechanical brake (EMB).

7. The apparatus for inhibiting movement of the automobile in the pitched position of claim 5, wherein said EMB comprises:
    an axle-mounted gear set;
    a latch mechanism; and
    a solenoid that is configured to selectively engage said latch mechanism and said axle-mounted gear set.

8. The apparatus for inhibiting movement of the automobile in the pitched position of claim 1, wherein said speed sensor is an accelerometer.

9. The apparatus for inhibiting movement of the automobile in the pitched position of claim 1, wherein said speed sensor is a drive shaft sensor.

10. The apparatus for inhibiting movement of the automobile in the pitched position of claim 1, wherein said attitude sensor is a fluid level sensor in a fluid reservoir.

11. The apparatus for inhibiting movement of the automobile in the pitched position of claim 2, wherein said controller is further configured to determine a clutch command and an engine idle command to inhibit movement of the automobile with said automobile drive train.

12. The apparatus for inhibiting movement of the automobile in the pitched position of claim 1, wherein said controller is further configured to calculate a clutch command and an engine idle command to inhibit movement of the automobile if said speed is greater than a speed threshold and said pitch is greater than a pitch threshold.

13. The apparatus for inhibiting movement of the automobile in the pitched position of claim 1, wherein said controller is further configured to calculate a clutch command and an engine idle command to inhibit movement of the automobile if the automobile is configured for forward motion and said pitch indicates the front of the automobile is facing up an inclined surface.

14. The apparatus for inhibiting movement of the automobile in the pitched position of claim 1, wherein said controller is further configured to calculate a clutch command and an engine idle command to inhibit movement of the automobile if the automobile is configured for reverse motion and said pitch indicates the rear of the automobile is facing up an inclined surface.

15. The apparatus for inhibiting movement of the automobile in the pitched position of claim 6, wherein said controller is further configured to engage the EMB to inhibit movement of the automobile and disengage said wheel brake from inhibiting movement of the automobile if a determination is made that an operator of the automobile is requesting a substantially steady brake pressure and a deployment period for the EMB expires.

16. The apparatus for inhibiting movement of the automobile in the pitched position of claim 6, wherein said controller is further configured to inhibit movement with said wheel brake according to a calculated brake command and disengage said EMB system from inhibiting movement of the automobile if a determination is made that an operator of the automobile has altered a brake pressure request and a mechanical delay has expired that is associated with a period the wheel brakes take to establish a braking torque specified by the calculated brake command.

17. The apparatus for inhibiting movement of the automobile in the pitched position of claim 1, wherein said controller is further configured to calculate a brake command if an operator of the automobile is requesting a reduction in braking torque.

18. A method for inhibiting movement of an automobile in a pitched position, comprising:
    determining a pitch of the automobile;
    determining a speed of the automobile;
    evaluating said pitch and said speed of the automobile; and controlling a braking mechanism based at least in part upon said evaluating said pitch and said speed in order to inhibit movement of the automobile in the pitched position.

19. The method for inhibiting movement of the automobile in the pitched position of claim 18, wherein said braking mechanism is an automobile drive train.

20. The method for inhibiting movement of the automobile in the pitched position of claim 19, wherein said automobile drive train comprises:

an engine of the automobile;

a transmission coupled to said engine;

a drive shaft coupled to said transmission;

a differential coupled to said drive shaft; and a wheel coupled to said differential.

21. The method for inhibit movement of the automobile in the pitched position of claim 18, wherein said braking mechanism is a wheel braking system.

22. The method for inhibiting movement of the automobile in the pitched position of claim 18, wherein said braking mechanism is an electro-mechanical brake (EMB).

23. The method for inhibiting movement of the automobile in the pitched position of claim 18, wherein said wheel braking system comprises a wheel brake and an electro-mechanical brake (EMB).

24. The method for inhibiting movement of the automobile in the pitched position of claim 22, wherein said EMB comprises:

an axle-mounted gear set;

a latch mechanism; and a solenoid that is configured to selectively engage said latch mechanism and said axle-mounted gear set.

25. The method for inhibiting movement of the automobile in the pitched position of claim 19, further comprising the steps of determining a clutch command and an engine idle command to inhibit movement of the automobile.

26. The method for inhibiting movement of the automobile in the pitched position of claim 18, further comprising the steps of calculating a clutch command and an engine idle command to inhibit movement of the automobile if said speed is greater than a speed threshold and said pitch is greater than a pitch threshold.

27. The method for inhibiting movement of the automobile in the pitched position of claim 18, further comprising the steps of calculating a clutch command and an engine idle command to inhibit movement of the automobile if the automobile is configured for forward motion and said pitch indicates the front of the automobile is facing up an inclined surface.

28. The method for inhibiting movement of the automobile in the pitched position of claim 18, further comprising the steps of calculating a clutch command and an engine idle command to inhibit movement of the automobile if the automobile is configured for reverse motion and said pitch indicates the rear of the automobile is facing up an inclined surface.

29. The method for inhibiting movement of the automobile in the pitched position of claim 23, further comprising the steps of engaging the EMB to inhibit movement of the automobile and disengaging said wheel brake from inhibiting movement of the automobile if a determination is made that an operator of the automobile is requesting a substantially steady brake pressure and a deployment period for said EMB expires.

30. The method for inhibiting movement of the automobile in the pitched position of claim 23, further comprising the steps of inhibiting movement with said wheel brake according to a calculated brake command and disengaging said EMB from inhibiting movement of the automobile if a determination is made that an operator of the automobile has altered a brake pressure request and a mechanical delay has expired that is associated with a period said wheel brakes take to establish a braking torque specified by the calculated brake command.

31. The method for inhibiting movement of the automobile in the pitched position of claim 18, further comprising the steps of calculating a brake command if an operator of the automobile is requesting a reduction in braking torque.

* * * * *